United States Patent
Elbaum et al.

(10) Patent No.: US 11,816,229 B2
(45) Date of Patent: Nov. 14, 2023

(54) PLAINTEXT INTEGRITY PROTECTION MECHANISM

(71) Applicant: Intel Corporation, Santa Clara, CA (US)

(72) Inventors: Reuven Elbaum, Haifa (IL); Gyora Benedek, Kiriat Bialik (IL); Avinash L. Varna, Chandler, AZ (US); David Novick, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 243 days.

(21) Appl. No.: 17/401,459

(22) Filed: Aug. 13, 2021

(65) Prior Publication Data

US 2021/0374256 A1    Dec. 2, 2021

(51) Int. Cl.
*G06F 21/00* (2013.01)
*G06F 21/60* (2013.01)
*H04L 9/32* (2006.01)

(52) U.S. Cl.
CPC .......... *G06F 21/602* (2013.01); *H04L 9/3236* (2013.01)

(58) Field of Classification Search
None
See application file for complete search history.

(56) References Cited

U.S. PATENT DOCUMENTS

| | | | |
|---|---|---|---|
| 8,126,145 B1* | 2/2012 | Tewari | H04W 12/50 370/428 |
| 2007/0106896 A1* | 5/2007 | Sandberg | H04L 9/0643 713/170 |
| 2008/0084996 A1* | 4/2008 | Chen | H04L 9/0637 380/28 |
| 2019/0220721 A1* | 7/2019 | Chhabra | G06K 19/0724 |
| 2020/0026883 A1* | 1/2020 | de Almeida | H04L 9/002 |

FOREIGN PATENT DOCUMENTS

| | | | | |
|---|---|---|---|---|
| CN | 110659505 A | * | 1/2020 | ........... G06F 21/602 |
| EP | 3958499 A1 | | 2/2022 | |

OTHER PUBLICATIONS

Notification of Publication of Chinese Patent Application No. 202110956307.9 dated Feb. 28, 2022.
Extended European Search Report for EP21191829.7, 6 pages, dated Jan. 20, 2022.

* cited by examiner

*Primary Examiner* — Andrew J Steinle
(74) *Attorney, Agent, or Firm* — Jaffery Watson Mendonsa & Hamilton LLP (57) ABSTRACT

An apparatus is described including cryptography circuitry to generate authentication tags to provide integrity protection for plaintext and ciphertext.

19 Claims, 8 Drawing Sheets

PLAINTEXT INTEGRITY PROTECTION MECHANISM

CROSS-REFERENCE

This patent application is related to and, under 35 U.S.C. 119, claims the benefit of and priority to U.S. Provisional Patent Application No. 63/067,995, entitled PLAINTEXT INTEGRITY PROTECTION MECHANISM, by Reuven Elbaum, et al., filed Aug. 20, 2020, where the contents of which are incorporated herein by reference.

FIELD

Embodiments described herein relate generally to data processing and more particularly to facilitating plaintext integrity protection for link encryption in computing environments.

BACKGROUND

There is currently a high demand for high levels of confidentiality and data integrity on links between central processing units (CPUs) and off-die devices. Conventional techniques utilize a standard cryptographic construction based on Advanced Encryption Standard-Galois/Counter Mode (AES-GCM) to ensure confidentiality and integrity of data. AES-GCM is limited to offering integrity for encrypted data (e.g., ciphertext) transferred on a link. However, AES-GCM and similar techniques do not guarantee integrity of decrypted plaintext in the presence of random or malicious faults in encryption and/or decryption. Further, existing link protocols do not have any reserved space that may be repurposed for transmission of additional plaintext authentication information.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In the following description, numerous specific details are set forth. However, embodiments, as described herein, may be practiced without these specific details. In other instances, well-known circuits, structures and techniques have not been shown in detail in order not to obscure the understanding of this description.

Embodiments provide for a technique for plaintext integrity protection for link encryption in computing environments.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Figure 1:
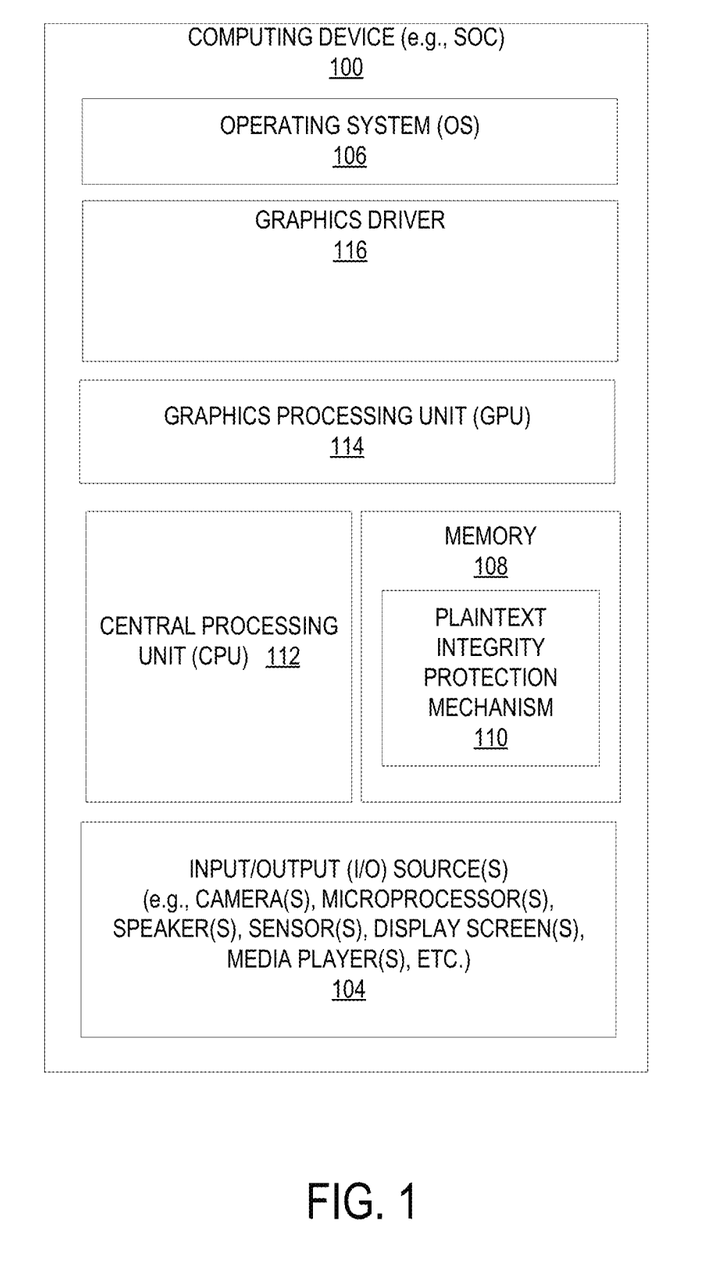
FIG. 1 illustrates a computing device according to one embodiment.

FIG. 1 illustrates one embodiment of a computing device 100. As shown in FIG. 1, computing device 100 may host plaintext integrity protection mechanism 110. According to one embodiment, computing device 100 comprises a computer platform hosting an integrated circuit ("IC"), such as a system on a chip ("SoC" or "SOC"), integrating various hardware and/or software components of computing device 100 on a single chip.

Computing device 100 represents a communication and data processing device including or representing any number and type of smart devices, such as (without limitation) smart command devices or intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet-based cable television set-top boxes, etc.), global positioning system (GPS)-based devices, etc.

In some embodiments, computing device 100 may include (without limitation) autonomous machines or artificially intelligent agents, such as a mechanical agents or machines, electronics agents or machines, virtual agents or machines, electro-mechanical agents or machines, etc. Examples of autonomous machines or artificially intelligent agents may include (without limitation) robots, autonomous vehicles (e.g., self-driving cars, self-flying planes, self-sailing boats, etc.), autonomous equipment (self-operating construction vehicles, self-operating medical equipment, etc.), and/or the like. Further, "autonomous vehicles" are not limed to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 100 may include a cloud computing platform consisting of a plurality of server computers, where each server computer employs or hosts a multifunction perceptron mechanism. For example, automatic ISP tuning may be performed using component, system, and architectural setups described earlier in this document. For example, some of the aforementioned types of devices may be used to implement a custom learned procedure, such as using field-programmable gate arrays (FPGAs), etc.

As illustrated, in one embodiment, computing device 100 may include any number and type of hardware and/or software components, such as (without limitation) graphics processing unit 114 ("GPU" or simply "graphics processor"), graphics driver 116 (also referred to as "GPU driver", "graphics driver logic", "driver logic", user-mode driver (UMD), UMD, user-mode driver framework (UMDF), UMDF, or simply "driver"), central processing unit 112 ("CPU" or simply "application processor"), memory 108, network devices, drivers, or the like, as well as input/output (I/O) sources 104, such as touchscreens, touch panels, touch pads, virtual or regular keyboards, virtual or regular mice, ports, connectors, etc. Computing device 100 may include operating system (OS) 106 serving as an interface between hardware and/or physical resources of computing device 100 and a user.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

In one embodiment, as illustrated, plaintext integrity protection mechanism 110 may be hosted by memory 108 of computing device 100. In another embodiment, plaintext integrity protection mechanism 110 may be hosted by or be part of operating system 106 of computing device 100. In another embodiment, plaintext integrity protection mechanism 110 may be hosted or facilitated by graphics driver 116. In yet another embodiment, plaintext integrity protection mechanism 110 may be hosted by or part of graphics processing unit 114 ("GPU" or simply graphics processor") or firmware of graphics processor 114. For example, plaintext integrity protection mechanism 110 may be embedded in or implemented as part of the processing hardware of graphics processor 114. Similarly, in yet another embodiment, plaintext integrity protection mechanism 110 may be hosted by or part of central processing unit 112 ("CPU" or simply "application processor"). For example, plaintext integrity protection mechanism 110 may be embedded in or implemented as part of the processing hardware of application processor 112.

In yet another embodiment, plaintext integrity protection mechanism 110 may be hosted by or part of any number and type of components of computing device 100, such as a portion of plaintext integrity protection mechanism 110 may be hosted by or part of operating system 106, another portion may be hosted by or part of graphics processor 114, another portion may be hosted by or part of application processor 112, while one or more portions of plaintext integrity protection mechanism 110 may be hosted by or part of operating system 106 and/or any number and type of devices of computing device 100. It is contemplated that embodiments are not limited to certain implementation or hosting of plaintext integrity protection mechanism 110 and that one or more portions or components of plaintext integrity protection mechanism 110 may be employed or implemented as hardware, software, or any combination thereof, such as firmware.

Computing device 100 may host network interface(s) to provide access to a network, such as a LAN, a wide area network (WAN), a metropolitan area network (MAN), a personal area network (PAN), Bluetooth, a cloud network, a mobile network (e.g., $3^{rd}$ Generation (3G), $4^{th}$ Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 2:
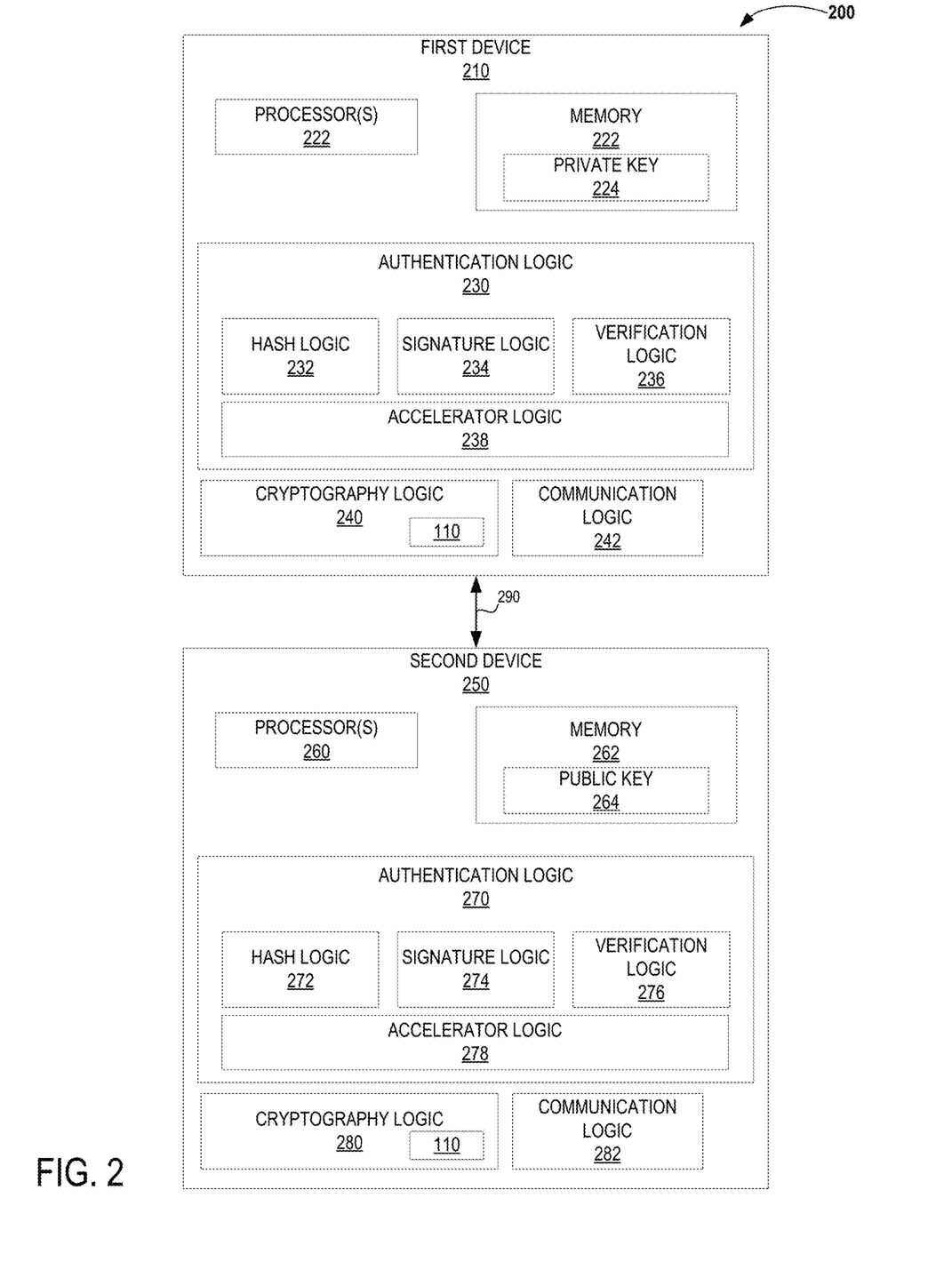
FIG. 2 illustrates a high-level architecture of a secure environment according to one embodiment.

Referring to FIG. 2, it illustrates a high-level architecture of a secure environment 200 that includes a first device 210 and a second device 250, where each device 210, 250 hosts a plaintext integrity protection mechanism, according to one embodiment. Referring to FIG. 2, each of the first device 210 and the second device 250 may be embodied as any type of computing device capable of performing the functions described herein, such as computing device 100 of FIG. 1. For example, in some embodiments, each of the first device 210 and the second device 250 may be embodied as a laptop computer, tablet computer, notebook, netbook, Ultrabook™, a smartphone, cellular phone, wearable computing device, personal digital assistant, mobile Internet device, desktop computer, router, server, workstation, and/or any other computing/communication device.

As illustrated, FIG. 2 offers another embodiment, different from the one illustrated in FIG. 1, where here in FIG. 2, plaintext integrity protection mechanism 110 is included in both devices 210, 250 in communication over communication link 290. As illustrated, in embodiment, plaintext integrity protection mechanism 110 is shown as hosted by cryptography logic 240 and 280 at first device 210 and second device 250, respectively.

First device 210 includes one or more processor(s) 220 and a memory 222 to store a private key 224. The processor(s) 220 may be embodied as any type of processor capable of performing the functions described herein. For example, the processor(s) 220 may be embodied as a single or multi-core processor(s), digital signal processor, microcontroller, or other processor or processing/controlling circuit. Similarly, the memory 222 may be embodied as any type of volatile or non-volatile memory or data storage capable of performing the functions described herein. In operation, the memory 222 may store various data and software used during operation of the first device 210 such as operating systems, applications, programs, libraries, and drivers. The memory 222 is communicatively coupled to the processor(s) 220. In some examples the private key 224 may reside in a secure memory that may be part memory 222 or may be separate from memory 222.

First device 210 further comprises authentication logic 230 which includes memory 222, signature logic 234, and verification logic 236. Hash logic 232 is configured to hash (i.e., to apply a hash function to) a message (M) to generate a hash value (m') of the message M. Hash functions may include, but are not limited to, a secure hash function, e.g., secure hash algorithms SHA2-256 and/or SHA3-256, etc. SHA2-256 may comply and/or be compatible with Federal Information Processing Standards (FIPS) Publication 180-4, titled: "Secure Hash Standard (SHS)", published by National Institute of Standards and Technology (NIST) in March 2012, and/or later and/or related versions of this standard. SHA3-256 may comply and/or be compatible with FIPS Publication 202, titled: "SHA-3 Standard: Permutation-Based Hash and Extendable-Output Functions", published by NIST in August 2015, and/or later and/or related versions of this standard.

Signature logic 234 may be configured to generate a signature to be transmitted, i.e., a transmitted signature and/or to verify a signature. In instances in which the first device 210 is the signing device, the transmitted signature may include a number, L, of transmitted signature elements with each transmitted signature element corresponding to a respective message element. For example, for each message element, $m_i$, signature logic 234 may be configured to perform a selected signature operation on each private key element, $s_{ki}$ of the private key, $s_k$, a respective number of times related to a value of each message element, $m_i$ included in the message representative m'. For example, signature logic 234 may be configured to apply a selected hash function to a corresponding private key element, $s_{ki}$, $m_i$ times. In another example, signature logic 234 may be configured to apply a selected chain function (that contains a hash function) to a corresponding private key element, $s_{ki}$, $m_i$ times. The selected signature operations may, thus, correspond to a selected hash-based signature scheme.

Hash-based signature schemes may include, but are not limited to, a Winternitz (W) one time signature (OTS) scheme, an enhanced Winternitz OTS scheme (e.g., WOTS+), a Merkle many time signature scheme, an extended Merkle signature scheme (XMSS) and/or an extended Merkle multiple tree signature scheme (XMSS-MT), etc. Hash functions may include, but are not limited to SHA2-256 and/or SHA3-256, etc. For example, XMSS and/or XMSS-MT may comply or be compatible with one or more Internet Engineering Task Force (IETF®) published Requests for Comments (RFC) such as RFC 8391, entitled SMSS: eXtended Merkel Signature Scheme released May 2018.

Winternitz OTS is configured to generate a signature and to verify a received signature utilizing a hash function. Winternitz OTS is further configured to use the private key and, thus, each private key element, $s_{ki}$, one time. For example, Winternitz OTS may be configured to apply a hash function to each private key element, $m_i$ or N-$m_i$ times to generate a signature and to apply the hash function to each received message element N-$m_{i'}$ or times to generate a corresponding verification signature element. The Merkle many time signature scheme is a hash-based signature scheme that utilizes an OTS and may use a private key more than one time. For example, the Merkle signature scheme may utilize Winternitz OTS as the one-time signature scheme. WOTS+ is configured to utilize a family of hash functions and a chain function.

XMSS, WOTS+ and XMSS-MT are examples of hash-based signature schemes that utilize chain functions. Each chain function is configured to encapsulate a number of calls to a hash function and may further perform additional operations. The number of calls to the hash function included in the chain function may be fixed. Chain functions may improve security of an associated hash-based signature scheme. Hash-based signature balancing, as described herein, may similarly balance chain function operations.

Cryptography logic 240 is configured to perform various cryptographic and/or security functions on behalf of the signing device 210. In some embodiments, the cryptography logic 240 may be embodied as a cryptographic engine (or cryptography circuitry), an independent security co-processor of the signing device 210, a cryptographic accelerator incorporated into the processor(s) 220, or a standalone software/firmware. In some embodiments, the cryptography logic 240 may generate and/or utilize various cryptographic keys (e.g., symmetric/asymmetric cryptographic keys) to facilitate encryption, decryption, signing, and/or signature verification. Additionally, in some embodiments, the cryptography logic 240 may facilitate to establish a secure connection with remote devices over communication link. It should further be appreciated that, in some embodiments, the cryptography logic 240 and/or another module of the first device 210 may establish a trusted execution environment or secure enclave within which a portion of the data described herein may be stored and/or a number of the functions described herein may be performed.

After the signature is generated as described above, the message, M, and signature may then be sent by first device 210, e.g., via communication logic 242, to second device 250 via network communication link 290. In an embodiment, the message, M, may not be encrypted prior to transmission. In another embodiment, the message, M, may be encrypted prior to transmission. For example, the message, M, may be encrypted by cryptography logic 240 to produce an encrypted message.

Second device 250 may also include one or more processors 260 and a memory 262 to store a public key 264. As described above, the processor(s) 260 may be embodied as any type of processor capable of performing the functions described herein. For example, the processor(s) 260 may be embodied as a single or multi-core processor(s), digital signal processor, microcontroller, or other processor or processing/controlling circuit. Similarly, the memory 262 may be embodied as any type of volatile or non-volatile memory or data storage capable of performing the functions described herein. In operation, the memory 262 may store various data and software used during operation of the second device 250 such as operating systems, applications, programs, libraries, and drivers. The memory 262 is communicatively coupled to the processor(s) 260.

In some examples the public key 264 may be provided to computing device 250 in a previous exchange. The public key, $p_k$, is configured to contain a number L of public key elements, i.e., $p_k=[p_{k1}, \ldots, p_{kL}]$. The public key 264 may be stored, for example, to memory 262.

Second device 250 further comprises authentication logic 270 which includes hash logic 272, signature logic 274, and verification logic 276. As described above, hash logic 272 is configured to hash (i.e., to apply a hash function to) a message (M) to generate a hash message (m'). Hash functions may include, but are not limited to, a secure hash function, e.g., secure hash algorithms SHA2-256 and/or SHA3-256, etc. SHA2-256 may comply and/or be compatible with Federal Information Processing Standards (FIPS) Publication 180-4, titled: "Secure Hash Standard (SHS)", published by National Institute of Standards and Technology (NIST) in March 2012, and/or later and/or related versions of this standard. SHA3-256 may comply and/or be compatible with FIPS Publication 202, titled: "SHA-3 Standard: Permutation-Based Hash and Extendable-Output Functions", published by NIST in August 2015, and/or later and/or related versions of this standard.

In instances in which the second device is the verifying device, authentication logic 270 is configured to generate a verification signature based, at least in part, on the signature received from the first device and based, at least in part, on the received message representative (m'). For example, authentication logic 270 may configured to perform the same signature operations, i.e., apply the same hash function or chain function as applied by hash logic 232 of authentication logic 230, to each received message element a number, N-$m_{i'}$ (or $m_{i'}$), times to yield a verification message element. Whether a verification signature, i.e., each of the L verification message elements, corresponds to a corresponding public key element, $p_{ki}$, may then be determined. For example, verification logic 276 may be configured to compare each verification message element to the corresponding public key element, ph. If each of the verification message element matches the corresponding public key element, $p_{ki}$, then the verification corresponds to success. In other words, if all of the verification message elements match the public key elements, $p_{ki}, \ldots, p_{KL}$, then the verification corresponds to success. If any verification message element does not match the corresponding public key element, $p_{ki}$, then the verification corresponds to failure.

In some examples the authentication logic 230 of the first device 210 includes one or more accelerators 238 that cooperate with the hash logic 232, signature logic 234 and/or verification logic 236 to accelerate authentication operations. Similarly, in some examples the authentication logic 270 of the second device 250 includes one or more accelerators 278 that cooperate with the hash logic 272, signature logic 274 and/or verification logic 276 to accelerate authentication operations. Examples of accelerators are described in the following paragraphs and with reference to the accompanying drawings.

The various modules of the environment 200 may be embodied as hardware, software, firmware, or a combination thereof. For example, the various modules, logic, and other components of the environment 200 may form a portion of, or otherwise be established by, the processor(s) 220 of first device 210 or processor(s) 260 of second device 250, or other hardware components of the devices. As such, in some embodiments, one or more of the modules of the environment 200 may be embodied as circuitry or collection of electrical devices (e.g., an authentication circuitry, a cryptography circuitry, a communication circuitry, a signature circuitry, and/or a verification circuitry). Additionally, in some embodiments, one or more of the illustrative modules may form a portion of another module and/or one or more of the illustrative modules may be independent of one another.

As mentioned above, there is a demand for high levels of confidentiality and data integrity on links between CPUs and off-die devices, such as peripheral component interconnect express (PCIe), CXL, etc., endpoints. AES-GCM, which is currently used for link encryption, provides integrity protection for encrypted data transferred on a link. Unfortunately, AES-GCM, only provides integrity for the encrypted data (ciphertext) transferred on the link but does not guarantee the integrity of decrypted plaintext in the presence of random or malicious faults in the encryption and/or decryption. In addition, existing link protocols (e.g., CXL IDE) do not have any reserved space that may be repurposed for transmission of additional plaintext authentication information.

According to one embodiment, plaintext integrity protection mechanism 110 generates AES-GCM authentication tags implemented to provide integrity protection for both plaintext and ciphertext. In such an embodiment, plaintext integrity protection mechanism 110 generates an additional authentication tag for the plaintext, which is computed in parallel to (or concurrent with) the encryption (or decryption) of the ciphertext. In a further embodiment, plaintext integrity protection mechanism 110 combines the GCM ciphertext authentication tag and the additional plaintext authentication tag to generate a combined authentication tag. In this embodiment, the combined-authentication-tag is compatible with and configured to align with existing standards.

Figure 3:
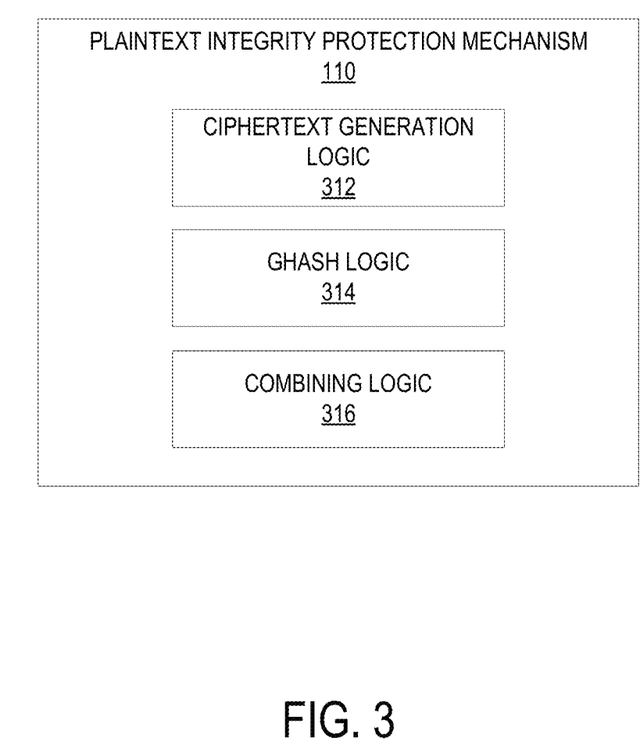
FIG. 3 illustrates a plaintext integrity protection mechanism according to one embodiment.

FIG. 3 illustrates one embodiment of plaintext integrity protection mechanism 110. As shown in FIG. 3, plaintext integrity protection mechanism 110 includes ciphertext generation logic 312. In one embodiment, ciphertext generation logic 312 generates ciphertext for sequentially numbered blocks. In such an embodiment, each block number is combined with an initialization vector (IV) and encrypted with a block cipher (e.g., AES). Subsequently, an exclusiveor (XOR) operation is performed using the result of the encryption and plaintext to generate the ciphertext. As used herein, plaintext is defined as unencrypted data.

Plaintext integrity protection mechanism 110 also includes GHASH logic 314 implemented to perform a GHASH function on blocks of ciphertext and encrypt the results to generate the ciphertext authentication tag (or outer tag). In one embodiment, the GHASH function is defined by:

$$GHASH(H,A,C)=X_{m+n+1},$$

where $H=E_k(0^{128})$ is the Hash Key, a string of 128 zero bits encrypted using the block cipher, A is data which is only authenticated (not encrypted), C is the ciphertext, is the number of 128-bit blocks in A (rounded up), n is the number of 128-bit blocks in C (rounded up), and the variable $X_i$ for i=0, . . . , m+n+1

In one embodiment, GHASH logic 314 is also implemented to perform a GHASH function and encrypted results on the plaintext implemented to generate the ciphertext in order to generate the plaintext authentication tag. In such an embodiment, the plaintext MASH function uses a different authentication key (Kp) to derive Hp, where $Hp=CIPH_{Kp}(0^{128})=AES_{Kp}(0^{128})$.). The additional key Kp may be a new input to the algorithm or may be derived from the original AES-GCM key via a suitable key derivation function. In a further embodiment, the plaintext authentication tag is generated in parallel with the generation of the ciphertext authentication tag.

Combining logic 316 combines the plaintext authentication tag and ciphertext authentication tag to generate the combined authentication tag. In one embodiment, the combined authentication tag has a tag length compliant with the existing AES-GCM standard authentication tags. In such an embodiment, given a total tag length of T bits for the standard AES-GCM construction and a tag length of L bits for ciphertext authentication tag, the plaintext authentication tag comprises (T-L) bits. In a further embodiment, combining logic 316 may combine the plaintext authentication tag and ciphertext authentication tag by performing an XOR operation.

Figure 4:
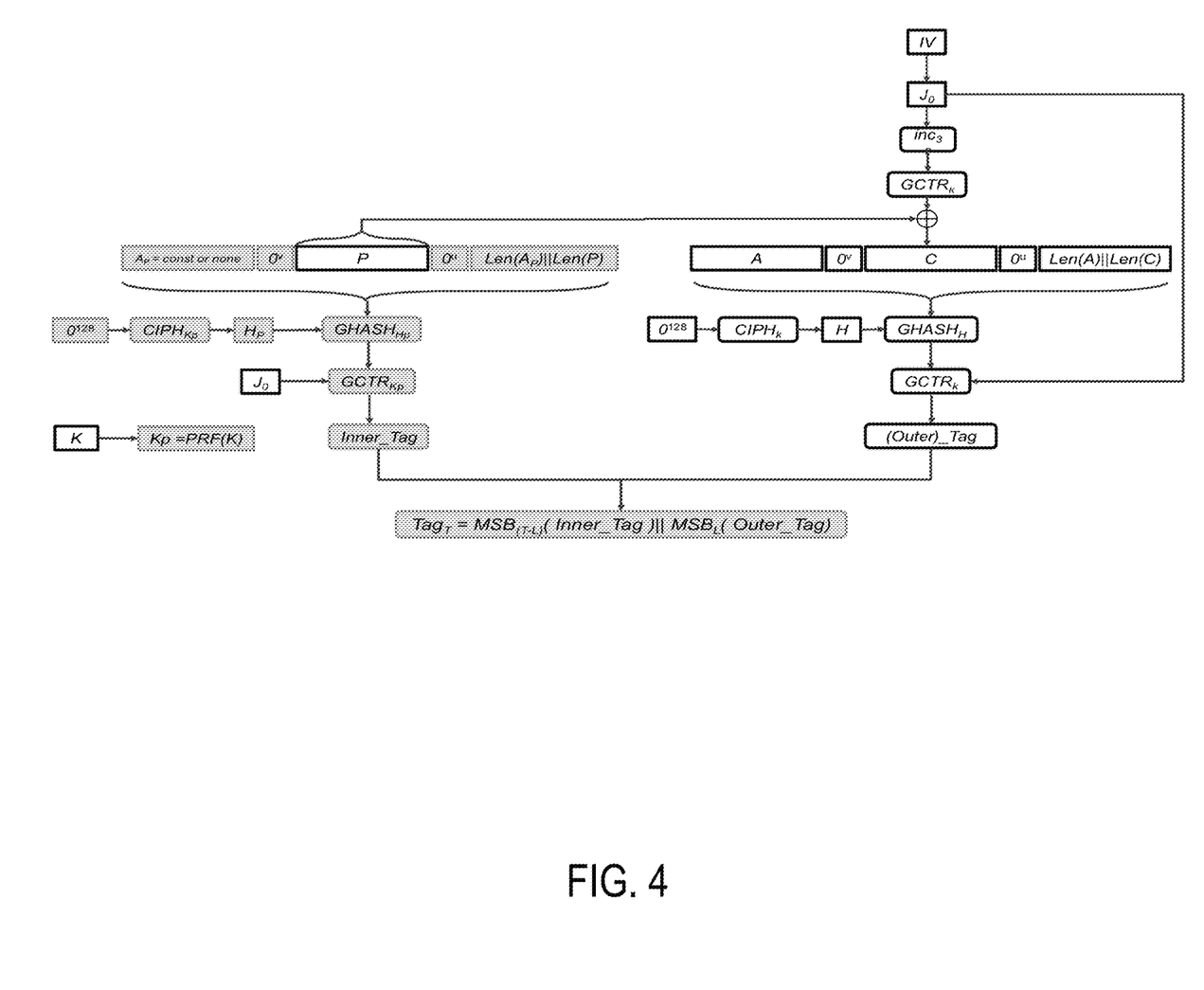
FIG. 4 illustrates a combined authentication tag according to one embodiment.

FIG. 4 illustrates one embodiment of a combined authentication tag. As shown in FIG. 4, the right side includes the standard AES-GCM tag construction, while the left side presents the additional plaintext authentication tag, which is a Galois Message Authentication Code (GMAC) of the plaintext. The final tag with T bit length is constructed by concatenating L bits from the outer-tag and (T-L) bits from the inner-tag. Current link protocols use AES-GCM with 96-bit tag, and there is no place in current protocols for extra tag bits. Thus, the outer-tag and inner-tag length is restricted to a combined 96 bits.

Figure 5:
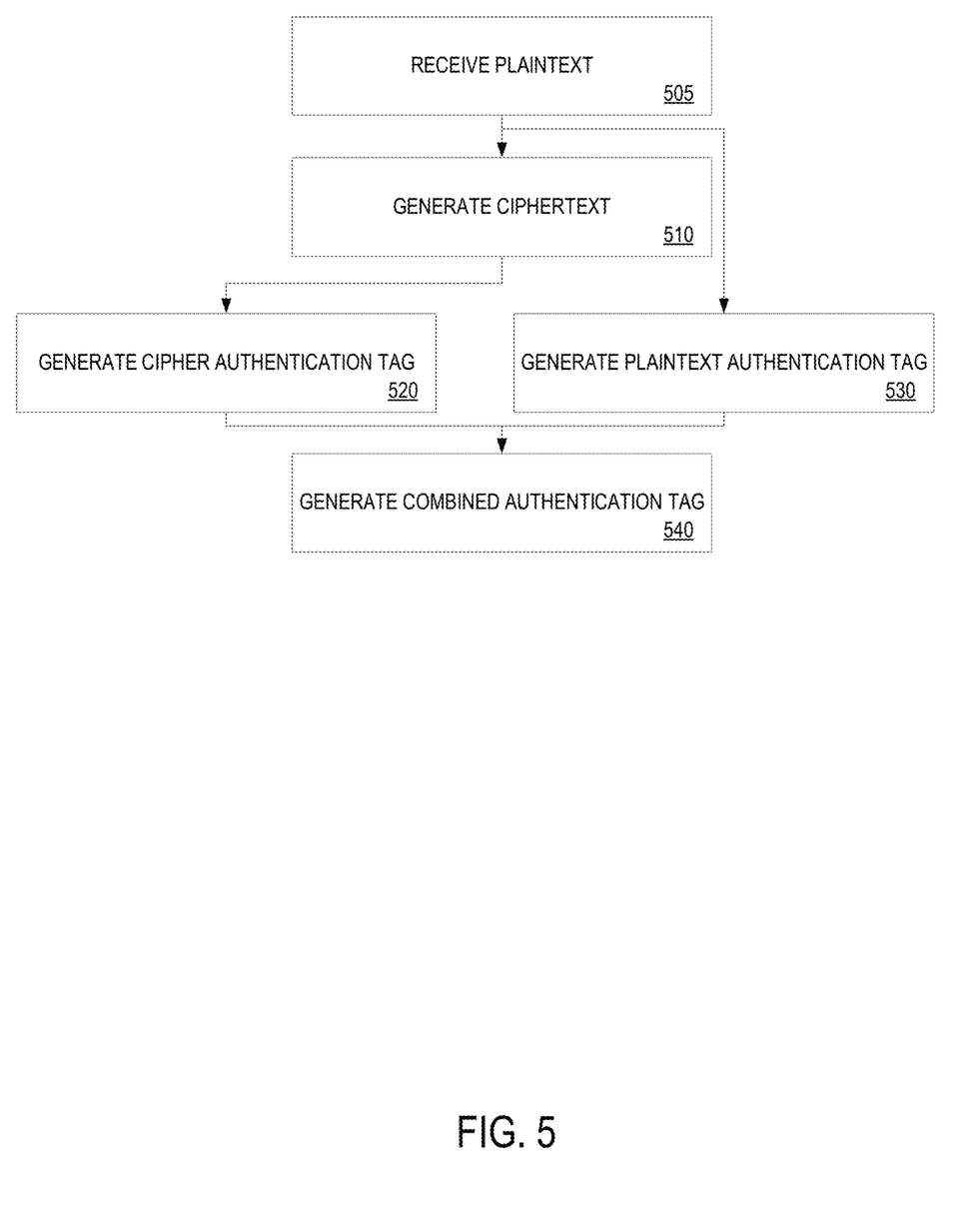
FIG. 5 is a flow diagram illustrating one embodiment of a process for performing plaintext integrity protection for link encryption.

FIG. 5 is a flow diagram illustrating one embodiment of a process for performing plaintext integrity protection for link encryption. At processing block 505, plaintext is received. At processing block 510, ciphertext is generated using the plaintext. As discussed above, the ciphertext is generated by performing an XOR operation using the result of an encryption and plaintext. At processing blocks 520 and 530, the plaintext authentication tag and ciphertext authentication tag are generated, respectively. As mentioned earlier, the plaintext authentication tag and ciphertext authentication tag are generated by performing GHASH functions on the plaintext and ciphertext in parallel. However, in other embodiments, the GHASH functions may performed sequentially. At processing block 540, the plaintext authentication tag and ciphertext authentication tag are combined to generate the combined authentication tag.

This above-described mechanism satisfies current requirements with respect to confidentiality and integrity of data either being restored from memory or being transmitted over links in the presence of random and/or malicious faults on plaintext. Further, the mechanism is capable of being compliant with AES-GCM, capable of reuse existing GHASH hardware, and offers none or only negligible degradation in link performance, where most of authentication can be done in parallel with any decryption process.

Figure 6:
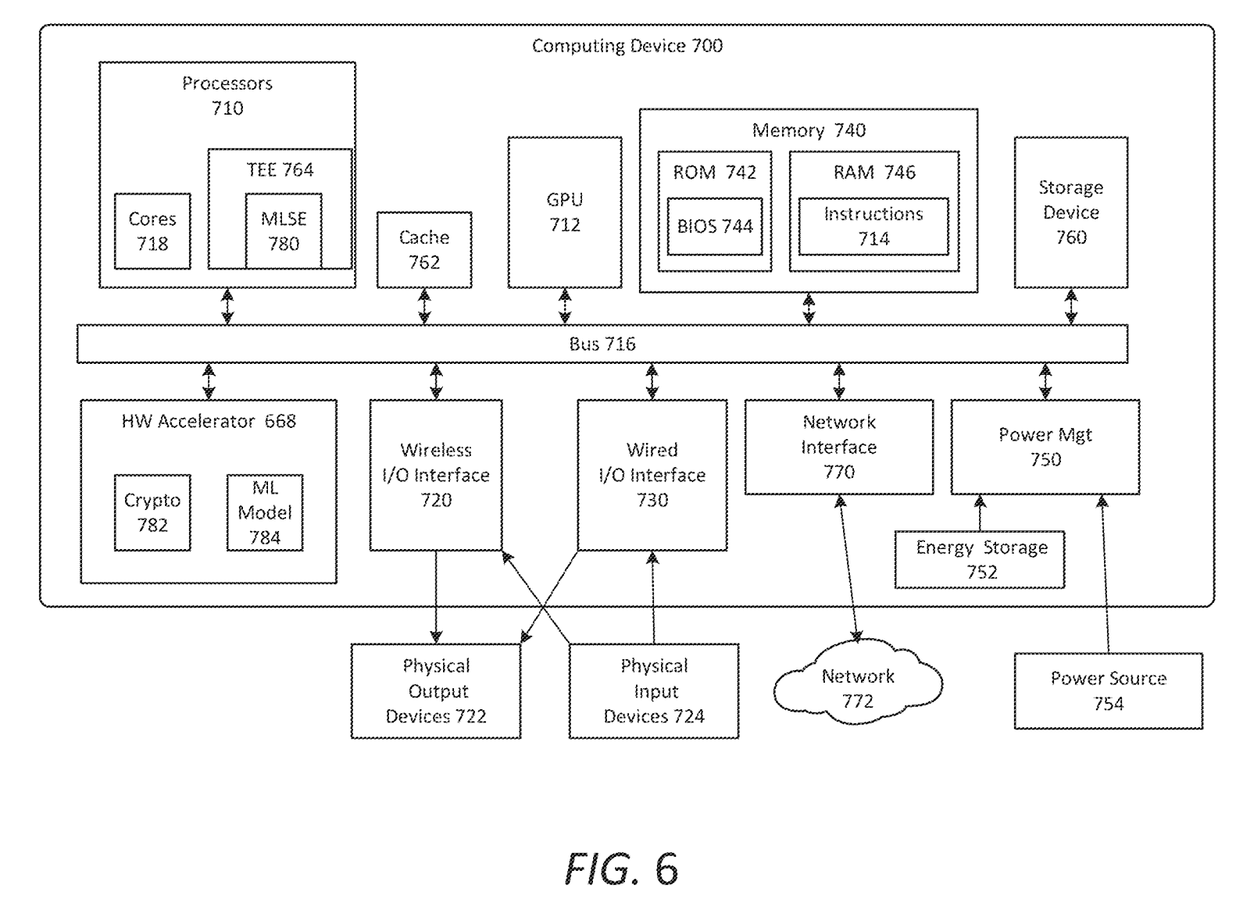
FIG. 6 illustrates a schematic diagram of an illustrative electronic computing device to enable enhanced protection against adversarial attacks according to some embodiments.

FIG. 6 is a schematic diagram of an illustrative electronic computing device to enable enhanced protection against adversarial attacks according to some embodiments. In some embodiments, the computing device 700 includes one or more processors 710 including one or more processors cores 718 and a TEE 764, the TEE including a machine learning service enclave (MLSE) 780. In some embodiments, the computing device 700 includes a hardware accelerator 768, the hardware accelerator including a cryptographic engine 782 and a machine learning model 784. In some embodiments, the computing device is to provide enhanced protections against ML adversarial attacks, as provided in FIGS. 1-5.

The computing device 700 may additionally include one or more of the following: cache 762, a graphical processing unit (GPU) 712 (which may be the hardware accelerator in some implementations), a wireless input/output (I/O) interface 720, a wired I/O interface 730, memory circuitry 740, power management circuitry 750, non-transitory storage device 760, and a network interface 770 for connection to a network 772. The following discussion provides a brief, general description of the components forming the illustrative computing device 700. Example, non-limiting computing devices 700 may include a desktop computing device, blade server device, workstation, or similar device or system.

In embodiments, the processor cores 718 are capable of executing machine-readable instruction sets 714, reading data and/or instruction sets 714 from one or more storage devices 760 and writing data to the one or more storage devices 760. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 718 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 700 includes a bus or similar communications link 716 that communicably couples and facilitates the exchange of information and/or data between various system components including the processor cores 718, the cache 762, the graphics processor circuitry 712, one or more wireless I/O interfaces 720, one or more wired I/O interfaces 730, one or more storage devices 760, and/or one or more network interfaces 770. The computing device 700 may be referred to in the singular herein, but this is not intended to limit the embodiments to a single computing device 700, since in certain embodiments, there may be more than one computing device 700 that incorporates, includes, or contains any number of communicably coupled, collocated, or remote networked circuits or devices.

The processor cores 718 may include any number, type, or combination of currently available or future developed devices capable of executing machine-readable instruction sets.

The processor cores 718 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 6 are of conventional design. Consequently, such blocks need not be described in further detail herein, as they will be understood by those skilled in the relevant art. The bus 716 that interconnects at least some of the components of the computing device 700 may employ any currently available or future developed serial or parallel bus structures or architectures.

The system memory 740 may include read-only memory ("ROM") 742 and random-access memory ("RAM") 746. A portion of the ROM 742 may be used to store or otherwise retain a basic input/output system ("BIOS") 744. The BIOS 744 provides basic functionality to the computing device 700, for example by causing the processor cores 718 to load and/or execute one or more machine-readable instruction sets 714. In embodiments, at least some of the one or more machine-readable instruction sets 714 cause at least a portion of the processor cores 718 to provide, create, produce, transition, and/or function as a dedicated, specific, and particular machine, for example a word processing machine, a digital image acquisition machine, a media playing machine, a gaming system, a communications device, a smartphone, or similar.

The computing device 700 may include at least one wireless input/output (I/O) interface 720. The at least one wireless I/O interface 720 may be communicably coupled to one or more physical output devices 722 (tactile devices, video displays, audio output devices, hardcopy output devices, etc.). The at least one wireless I/O interface 720 may communicably couple to one or more physical input devices 724 (pointing devices, touchscreens, keyboards, tactile devices, etc.). The at least one wireless I/O interface 720 may include any currently available or future developed wireless I/O interface. Example wireless I/O interfaces include, but are not limited to: BLUETOOTH®, near field communication (NFC), and similar.

The computing device 700 may include one or more wired input/output (I/O) interfaces 730. The at least one wired I/O interface 730 may be communicably coupled to one or more physical output devices 722 (tactile devices, video displays, audio output devices, hardcopy output devices, etc.). The at least one wired I/O interface 730 may be communicably coupled to one or more physical input devices 724 (pointing devices, touchscreens, keyboards, tactile devices, etc.). The wired I/O interface 730 may include any currently available or future developed I/O interface. Example wired I/O interfaces include but are not limited to: universal serial bus (USB), IEEE 1394 ("Fire-Wire"), and similar.

The computing device 700 may include one or more communicably coupled, non-transitory, data storage devices 760. The data storage devices 760 may include one or more hard disk drives (HDDs) and/or one or more solid-state storage devices (SSDs). The one or more data storage devices 760 may include any current or future developed storage appliances, network storage devices, and/or systems. Non-limiting examples of such data storage devices 760 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 760 may include one or more removable storage devices, such as one or more flash drives, flash memories, flash storage units, or similar appliances or devices capable of communicable coupling to and decoupling from the computing device 700.

The one or more data storage devices 760 may include interfaces or controllers (not shown) communicatively coupling the respective storage device or system to the bus 716. The one or more data storage devices 760 may store, retain, or otherwise contain machine-readable instruction sets, data structures, program modules, data stores, databases, logical structures, and/or other data useful to the processor cores 718 and/or graphics processor circuitry 712 and/or one or more applications executed on or by the processor cores 718 and/or graphics processor circuitry 712. In some instances, one or more data storage devices 760 may be communicably coupled to the processor cores 718, for example via the bus 716 or via one or more wired communications interfaces 730 (e.g., Universal Serial Bus or USB); one or more wireless communications interfaces 720 (e.g., Bluetooth®, Near Field Communication or NFC); and/or one or more network interfaces 770 (IEEE 802.3 or Ethernet, IEEE 802.11, or Wi-Fi®, etc.).

Processor-readable instruction sets 714 and other programs, applications, logic sets, and/or modules may be stored in whole or in part in the system memory 740. Such instruction sets 714 may be transferred, in whole or in part, from the one or more data storage devices 760. The instruction sets 714 may be loaded, stored, or otherwise retained in system memory 740, in whole or in part, during execution by the processor cores 718 and/or graphics processor circuitry 712.

The computing device 700 may include power management circuitry 750 that controls one or more operational aspects of the energy storage device 752. In embodiments, the energy storage device 752 may include one or more primary (i.e., non-rechargeable) or secondary (i.e., rechargeable) batteries or similar energy storage devices. In embodiments, the energy storage device 752 may include one or more supercapacitors or ultracapacitors. In embodiments, the power management circuitry 750 may alter, adjust, or control the flow of energy from an external power source 754 to the energy storage device 752 and/or to the computing device 700. The power source 754 may include, but is not limited to, a solar power system, a commercial electric grid, a portable generator, an external energy storage device, or any combination thereof.

For convenience, the processor cores 718, the graphics processor circuitry 712, the wireless I/O interface 720, the wired I/O interface 730, the storage device 760, and the network interface 770 are illustrated as communicatively coupled to each other via the bus 716, thereby providing connectivity between the above-described components. In alternative embodiments, the above-described components may be communicatively coupled in a different manner than illustrated in FIG. 6. For example, one or more of the above-described components may be directly coupled to other components, or may be coupled to each other, via one or more intermediary components (not shown). In another example, one or more of the above-described components may be integrated into the processor cores 718 and/or the graphics processor circuitry 712. In some embodiments, all or a portion of the bus 716 may be omitted and the components are coupled directly to each other using suitable wired or wireless connections.

Figure 7:
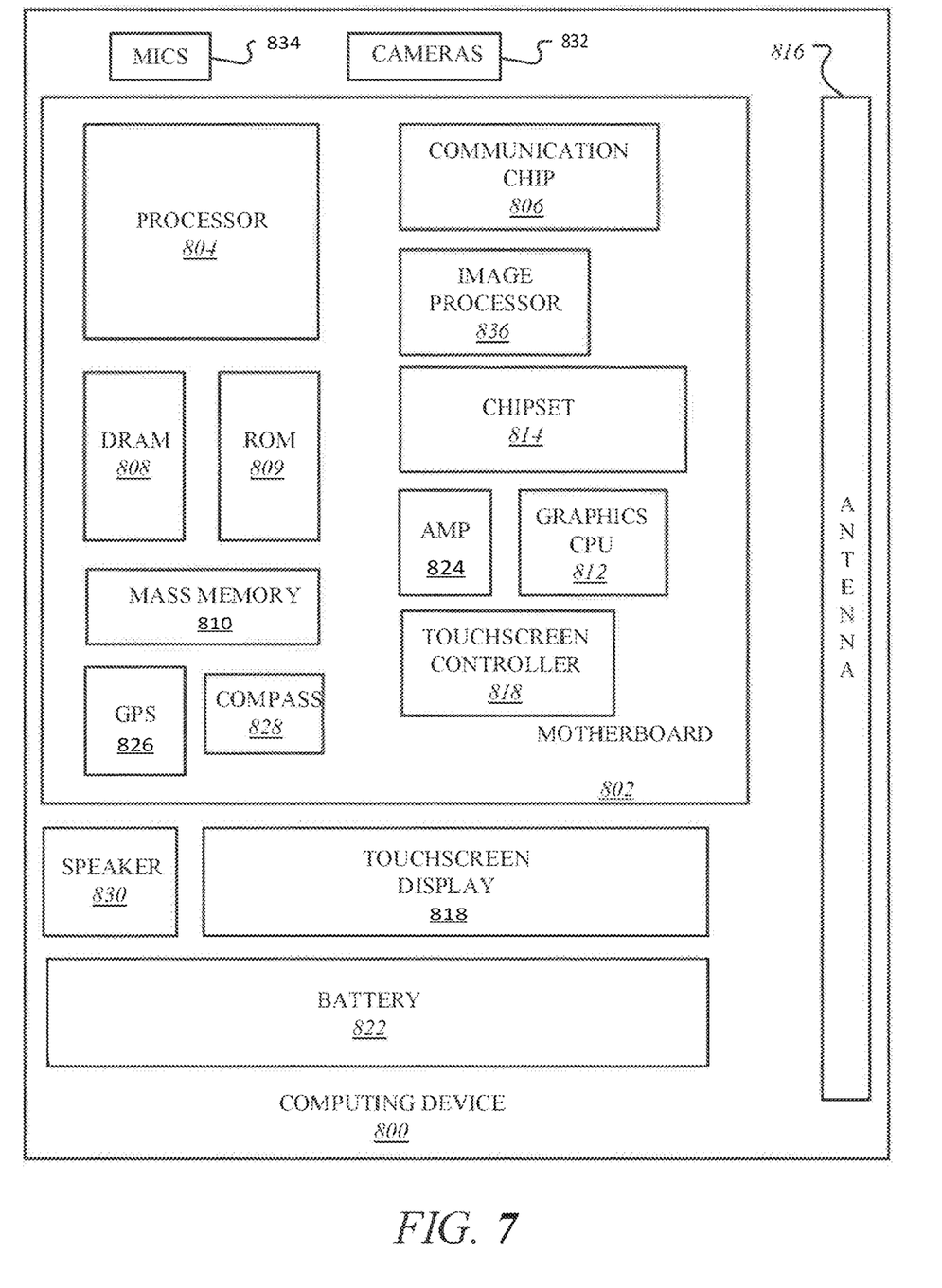
FIG. 7 illustrates a computer device capable of supporting and implementing one or more embodiments according to one embodiment.

FIG. 7 illustrates a computing device 800 in accordance with one implementation. It is contemplated that computing device 800 may be the same as or similar to computing device 100 of FIG. 1 and thus for brevity, many of the details discussed with reference to computing device 100 of FIG. 1 are not discussed or repeated hereafter. Computing device 800 houses a system board 802. The board 802 may include a number of components, including but not limited to a processor 804 and at least one communication package 806. The communication package is coupled to one or more antennas 816. The processor 804 is physically and electrically coupled to the board 802.

Depending on its applications, computing device 800 may include other components that may or may not be physically and electrically coupled to the board 802. These other components include, but are not limited to, volatile memory (e.g., DRAM) 808, non-volatile memory (e.g., ROM) 809, flash memory (not shown), a graphics processor 812, a digital signal processor (not shown), a crypto processor (not shown), a chipset 814, an antenna 816, a display 818 such as a touchscreen display, a touchscreen controller 820, a battery 822, an audio codec (not shown), a video codec (not shown), a power amplifier 824, a global positioning system (GPS) device 826, a compass 828, an accelerometer (not shown), a gyroscope (not shown), a speaker 830, cameras 832, a microphone array 834, and a mass storage device (such as hard disk drive) 810, compact disk (CD) (not shown), digital versatile disk (DVD) (not shown), and so forth). These components may be connected to the system board 802, mounted to the system board, or combined with any of the other components.

The communication package 806 enables wireless and/or wired communications for the transfer of data to and from the computing device 800. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 806 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 800 may include a plurality of communication packages 806. For instance, a first communication package 806 may be dedicated to shorter range wireless communications such as Wi-Fi and Bluetooth and a second communication package 806 may be dedicated to longer range wireless communications such as GPS, EDGE, GPRS, CDMA, WiMAX, LTE, Ev-DO, and others.

The cameras 832 including any depth sensors or proximity sensor are coupled to an optional image processor 836 to perform conversions, analysis, noise reduction, comparisons, depth or distance analysis, image understanding and other processes as described herein. The processor 804 is coupled to the image processor to drive the process with interrupts, set parameters, and control operations of image processor and the cameras. Image processing may instead be performed in the processor 804, the graphics CPU 812, the cameras 832, or in any other device.

In various implementations, the computing device 800 may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 800 may be any other electronic device that processes data or records data for processing elsewhere.

Figure 8:
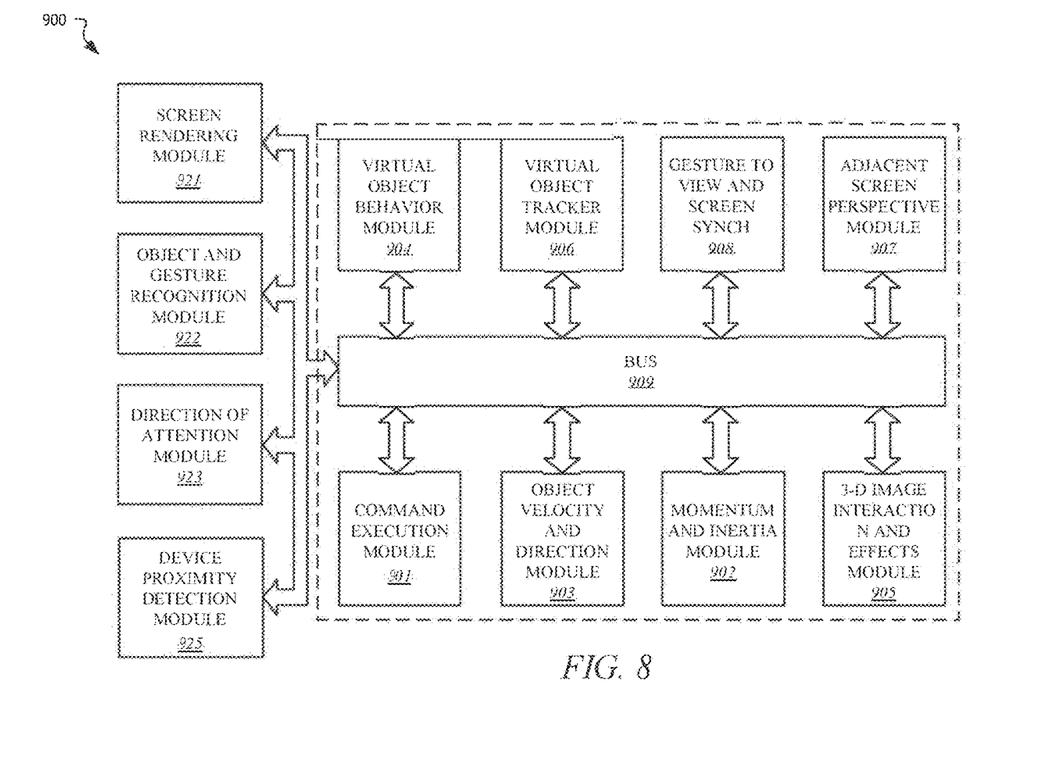
FIG. 8 illustrates a computing environment capable of supporting and implementing one or more embodiments according to one embodiment.

FIG. 8 illustrates an embodiment of a computing environment 900 capable of supporting the operations discussed above. The modules and systems can be implemented in a variety of different hardware architectures and form factors including that shown in FIG. 7.

The Command Execution Module 901 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 921 draws objects on the one or more multiple screens for the user to see. It can be adapted to receive the data from the Virtual Object Behavior Module 904, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 907, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition Module 922 may be adapted to recognize and track hand and arm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System using one or more cameras without the benefit of a touch surface.

The Direction of Attention Module 923 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 922 to ensure that the gestures or commands are associated with the appropriate library for the active display. Similarly, if the user is looking away from all of the screens, then commands can be ignored.

The Device Proximity Detection Module 925 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition Module 922. For a display device, it may be considered by the Adjacent Screen Perspective Module 907.

The Virtual Object Behavior Module 904 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 906 on the other hand may be adapted to track where a virtual object should be located in three-dimensional space in a vicinity of a display, and which body part of the user is holding the virtual object, based on input from the Object and Gesture Recognition Module. The Virtual Object Tracker Module 906 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 908, receives the selection of the view and screen or both from the Direction of Attention Module 923 and, in some cases, voice commands to determine which view is the active view and which screen is the active screen. It then causes the relevant gesture library to be loaded for the Object and Gesture Recognition Module 922. Various views of an application on one or more screens can be associated with alternative gesture libraries or a set of gesture templates for a given view.

The Adjacent Screen Perspective Module 907, which may include or be coupled to the Device Proximity Detection Module 925, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 907 may, in this way, determine coordinates of an adjacent screen relative to its own screen coordinates. Thus, the Adjacent Screen Perspective Module may determine which devices are in proximity to each other, and further potential targets for moving one or more virtual objects across screens. The Adjacent Screen Perspective Module may further allow the position of the screens to be correlated to a model of three-dimensional space representing all of the existing objects and virtual objects.

The Object and Velocity and Direction Module 903 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers.

The Momentum and Inertia Module 902 can use image motion, image size, and angle changes of objects in the image plane or in a three-dimensional space to estimate the velocity and direction of objects in the space or on a display. The Momentum and Inertia Module is coupled to the Object and Gesture Recognition Module 922 to estimate the velocity of gestures performed by hands, fingers, and other body parts and then to apply those estimates to determine momentum and velocities to virtual objects that are to be affected by the gesture.

The 3D Image Interaction and Effects Module 905 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays. As illustrated, various components, such as components 901, 902, 903, 904, 905, 906, 907, and 908 are connected via an interconnect or a bus, such as bus 909.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes an apparatus comprising cryptography circuitry to generate authentication tags.

Example 2 includes the subject matter of Example 1, wherein an authentication tag comprises a ciphertext authentication tag and a plaintext authentication tag.

Example 3 includes the subject matter of Examples 1 and 2, wherein the cryptography circuitry generates the plaintext authentication tag by performing a first hash function on plaintext and encrypting the results of the first hash function.

Example 4 includes the subject matter of Examples 1-3, wherein the cryptography circuitry generates the ciphertext authentication tag by performing a second hash function on ciphertext and encrypting the results of the second hash function.

Example 5 includes the subject matter of Examples 1-4, wherein the first hash function is performed using a first authentication key and the second hash function is performed using a second authentication key.

Example 6 includes the subject matter of Examples 1-5, wherein the cryptography circuitry performs the first hash function and the second hash function in parallel.

Example 7 includes the subject matter of Examples 1-6, wherein the cryptography circuitry combines the plaintext authentication tag and the ciphertext authentication tag to generate the authentication tag.

Example 8 includes the subject matter of Examples 1-7, wherein the cryptography circuitry combines the plaintext authentication tag and the ciphertext authentication tag by concatenating bits from the plaintext authentication tag and bits from the ciphertext authentication tag.

Example 9 includes the subject matter of Examples 1-8, wherein the cryptography circuitry combines the plaintext authentication tag and the ciphertext authentication tag by performing an exclusive or operation.

Some embodiments pertain to Example 10 that includes a method comprising generating authentication tags to provide integrity protection for plaintext and ciphertext.

Example 11 includes the subject matter of Example 10, wherein an authentication tag comprises a ciphertext authentication tag and a plaintext authentication tag.

Example 12 includes the subject matter of Examples 10 and 11, wherein generating the plaintext authentication tag comprises performing a first hash function on plaintext and encrypting the results of the first hash function.

Example 13 includes the subject matter of Examples 10-12, wherein generating the ciphertext authentication tag comprises performing a second hash function on ciphertext and encrypting the results of the second hash function.

Example 14 includes the subject matter of Examples 10-13, wherein the first hash function and the second hash function are performed in parallel.

Example 15 includes the subject matter of Examples 10-14, further comprising combining the plaintext authentication tag and the ciphertext authentication tag to generate the authentication tag.

Some embodiments pertain to Example 16 that includes at least one machine-readable medium comprising instructions which, when executed by a machine, cause the machine to generate authentication tags to provide integrity protection for plaintext and ciphertext.

Example 17 includes the subject matter of Example 16, wherein an authentication tag comprises a ciphertext authentication tag and a plaintext authentication tag.

Example 18 includes the subject matter of Examples 15 and 16, wherein generating the plaintext authentication tag comprises performing a first hash function on plaintext and encrypting the results of the first hash function.

Example 19 includes the subject matter of Examples 16-18, wherein generating the ciphertext authentication tag comprises performing a second hash function on ciphertext and encrypting the results of the second hash function.

Example 20 includes the subject matter of Examples 16-19, wherein the first hash function and the second hash function are performed in parallel.

Example 21 includes the subject matter of Examples 16-20, wherein the first hash function and the second hash function are performed sequentially.

Example 22 includes the subject matter of Examples 16-21, comprising instructions which, when executed by a machine, further cause the machine to combine the plaintext authentication tag and the ciphertext authentication tag to generate the authentication tag.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising cryptography circuitry to generate authentication tags to provide integrity protection for plaintext and ciphertext, including:
   generating a ciphertext authentication tag for the ciphertext; and generating a plaintext authentication tag for the plaintext implemented to generate the ciphertext.

2. The apparatus of claim 1, wherein the cryptography circuitry generating the plaintext authentication tag comprises performing a first hash function on the plaintext and encrypting results of the first hash function.

3. The apparatus of claim 2, wherein the cryptography circuitry generating the ciphertext authentication tag comprises performing a second hash function on the ciphertext and encrypting results of the second hash function.

4. The apparatus of claim 3, wherein the first hash function is performed using a first authentication key and the second hash function is performed using a second authentication key.

5. The apparatus of claim 4, wherein the cryptography circuitry performs the first hash function and the second hash function in parallel.

6. The apparatus of claim 4, wherein the cryptography circuitry combines the plaintext authentication tag and the ciphertext authentication tag to generate the authentication tag.

7. The apparatus of claim 6, wherein the cryptography circuitry combines the plaintext authentication tag and the ciphertext authentication tag by concatenating bits from the plaintext authentication tag and bits from the ciphertext authentication tag.

8. The apparatus of claim 6, wherein the cryptography circuitry combines the plaintext authentication tag and the ciphertext authentication tag by performing an exclusive or operation.

9. A method comprising generating authentication tags to provide integrity protection for plaintext and ciphertext, including:
generating a ciphertext authentication tag for the ciphertext; and
generating a plaintext authentication tag for the plaintext implemented to generate the ciphertext.

10. The method of claim 9, wherein generating the plaintext authentication tag comprises:
performing a first hash function on the plaintext; and
encrypting results of the first hash function.

11. The method of claim 10, wherein generating the ciphertext authentication tag comprises:
performing a second hash function on the ciphertext; and
encrypting results of the second hash function.

12. The method of claim 11, wherein the first hash function and the second hash function are performed in parallel.

13. The method of claim 11, further comprising combining the plaintext authentication tag and the ciphertext authentication tag to generate the authentication tag.

14. At least one non-transitory machine-readable medium comprising instructions which, when executed by a machine, cause the machine to generate authentication tags to provide integrity protection for plaintext and ciphertext, including:
generating a ciphertext authentication tag for the ciphertext; and
generating a plaintext authentication tag for the plaintext implemented to generate the ciphertext.

15. The machine-readable medium of claim 14, wherein generating the plaintext authentication tag comprises:
performing a first hash function on the plaintext; and
encrypting results of the first hash function.

16. The machine-readable medium of claim 15, wherein generating the ciphertext authentication tag comprises:
performing a second hash function on the ciphertext; and
encrypting results of the second hash function.

17. The machine-readable medium of claim 16, wherein the first hash function and the second hash function are performed in parallel.

18. The machine-readable medium of claim 16, wherein the first hash function and the second hash function are performed sequentially.

19. The machine-readable medium of claim 16, comprising instructions which, when executed by a machine, further cause the machine to combine the plaintext authentication tag and the ciphertext authentication tag to generate the authentication tag.

* * * * *